(12) United States Patent
Altea et al.

(10) Patent No.: US 8,552,614 B2
(45) Date of Patent: Oct. 8, 2013

(54) GENERATOR STATOR CONFIGURATION

(75) Inventors: Claudinei Altea, Heidenheim (DE); Joao Carlos Benedetti, Osasco Sao Paulo (BR)

(73) Assignee: Voith Patent GmbH, Heidenheim (DE)

( * ) Notice: Subject to any disclaimer, the term of this patent is extended or adjusted under 35 U.S.C. 154(b) by 385 days.

(21) Appl. No.: 12/735,834

(22) PCT Filed: Feb. 6, 2009

(86) PCT No.: PCT/EP2009/000820
§ 371 (c)(1),
(2), (4) Date: Dec. 3, 2010

(87) PCT Pub. No.: WO2009/118077
PCT Pub. Date: Oct. 1, 2009

(65) Prior Publication Data
US 2011/0109191 A1 May 12, 2011

(30) Foreign Application Priority Data
Mar. 22, 2008 (DE) .......................... 10 2008 015 450

(51) Int. Cl.
*H02K 1/06* (2006.01)
*H02K 1/18* (2006.01)

(52) U.S. Cl.
USPC ............ 310/216.118; 310/431; 310/216.136; 310/422; 310/427

(58) Field of Classification Search
USPC ................... 310/216.118, 431, 216.136, 422, 310/427
See application file for complete search history.

(56) References Cited

U.S. PATENT DOCUMENTS

| | | | | |
|---|---|---|---|---|
| 201,968 A | * | 4/1878 | Weston | 310/40 R |
| 630,409 A | * | 8/1899 | Reist | 310/269 |
| 982,806 A | * | 1/1911 | Fechheimer | 310/40 R |
| 1,361,136 A | * | 12/1920 | Burke | 310/426 |
| 1,415,564 A | * | 5/1922 | Holahan | 310/216.118 |
| 1,494,047 A | * | 5/1924 | Williamson | 310/64 |
| 1,703,087 A | * | 2/1929 | Daun et al. | 310/216.118 |
| 1,822,096 A | | 9/1931 | Hollander | |
| 1,873,989 A | * | 8/1932 | Williamson | 310/57 |
| 1,936,744 A | * | 11/1933 | Adams | 310/432 |
| 2,399,352 A | * | 4/1946 | Jones | 310/216.124 |
| 2,593,857 A | * | 4/1952 | De Windt et al. | 310/216.136 |
| 2,720,600 A | * | 10/1955 | Pollard | 310/51 |

(Continued)

FOREIGN PATENT DOCUMENTS

| | | |
|---|---|---|
| CH | 530109 A | 10/1972 |
| DE | 1613192 A1 | 10/1970 |

(Continued)

OTHER PUBLICATIONS

Translation of foreign document JP 05030689.*

*Primary Examiner* — Tran Nguyen
*Assistant Examiner* — Alex W Mok
(74) *Attorney, Agent, or Firm* — Farjami & Farjami LLP

(57) ABSTRACT

The invention relates to a generator stator configuration, comprising
a stiffened stator core having a multitude of stator plates, which have stator teeth on the radial inner periphery of the stator core, each stator plate having a material bond to an adjacent stator plate and/or to a stiffening element on the radial outer periphery on at least one connection point; and
a spring-elastic support structure to implement an elastic foundation connection for the stiffened stator core.

19 Claims, 2 Drawing Sheets

(56) References Cited

U.S. PATENT DOCUMENTS

| | | | | |
|---|---|---|---|---|
| 2,783,404 | A | * | 2/1957 | Appenzeller .......... 310/216.136 |
| 2,790,918 | A | * | 4/1957 | Goran .................... 310/216.136 |
| 2,876,371 | A | * | 3/1959 | Wesolowski ........... 310/216.129 |
| 3,099,760 | A | * | 7/1963 | Hoffmann .............. 310/216.114 |
| 3,237,035 | A | * | 2/1966 | Hoffmann .............. 310/216.114 |
| 3,387,152 | A | | 6/1968 | Mücke |
| 3,787,744 | A | * | 1/1974 | Saito ...................... 310/216.011 |
| 3,988,622 | A | | 10/1976 | Starcevic |
| 5,767,602 | A | * | 6/1998 | Sargeant ........................ 310/432 |
| 6,455,976 | B1 | * | 9/2002 | Nakano .................. 310/216.114 |
| 6,477,761 | B1 | | 11/2002 | Ohashi |
| 2002/0070630 | A1 | | 6/2002 | Dawson |
| 2008/0042514 | A1 | * | 2/2008 | Cook et al. .................... 310/258 |

FOREIGN PATENT DOCUMENTS

| | | |
|---|---|---|
| DE | 2220420 A1 | 11/1973 |
| DE | 10012849 A1 | 12/2000 |
| EP | 1246341 A2 | 10/2002 |
| GB | 322829 A | 12/1929 |
| GB | 406004 A | 2/1934 |
| GB | 695415 A | 8/1953 |
| GB | 821612 A | 10/1959 |
| GB | 1114413 A | 5/1968 |
| JP | 405030689 A | 2/1993 |
| JP | 2000092756 A | 3/2000 |

* cited by examiner

GENERATOR STATOR CONFIGURATION

This is a U.S. national phase application which is based on, and claims priority from, PCT application Serial No. PCT/EP2009/000820, filed on Feb. 6, 2009, which claims priority from foreign application Serial No. DE 102008015450.4, filed on Mar. 22, 2008, in Germany.

The invention relates to a generator stator configuration and an electrical generator, in particular for use for a hydroelectric plant having such a generator stator configuration.

Large-scale generator stators for multipole electrical synchronous generators of hydroelectric plants having a vertical longitudinal axis, which also forms the rotational axis of the generator rotor, are known in a multitude of embodiments. Such a generator stator typically comprises a combination of a stator core and a stator frame. The stator core is used for absorbing dynamic and static loads and thus fulfills the support function for the generator core, which generates the magnetic effect.

The generator core itself comprises a multitude of stator plates in the form of ring segments, typically based on an iron alloy. The stator plates have stator teeth toward the air gap of the electrical generator and thus toward the radial inner periphery, so that grooves result for laying stator windings. The individual stator plates are electrically insulated from one another at least in the magnetically active areas, this is caused by insulating intermediate layers or by a lamination of the stator plates.

During the construction of the generator stator, the plate packets are typically formed in that the stator plates are brought into connection with the stator frame one after another. Formfitting connections on the radial outer periphery of the stator plates come into consideration in particular—reference is made for this purpose to a US 20002070630 A as an example, which discloses a dovetail connection for fastening the stator plates on support ribs on the stator frame. Furthermore, welding the individual stator plates on the stator frame is known—reference is made to GB 406004 A in this regard.

During operation of an electrical machine, high electromagnetic forces are transmitted to the generator stator, which may deform it in particular for a rotor having a small pole number. Furthermore, force and torque effects may result in vibrations of the generator stator. While these are predominantly radial vibrations during normal operation, in case of fault in the event of a short-circuit, torsional vibrations arise. In the case of the latter, operating states may occur in which the nominal air gap torque is exceeded by up to a factor of 10. The vibration movements resulting therefrom, in particular torsional vibrations of the generator stator, may result in force effects which exceed its structural strength and have a destructive effect.

Known countermeasures for damping vibrations in the generator stator comprise an elastic suspension of the generator core in the generator stator—in this regard, GB 821612 A and GB 695415 A are cited as examples. Through an elastic suspension of the stator core in the stator frame, the natural frequency is lowered for relative vibrations between the stator core, in which the magnetic forces are induced, and the stator frame as the support structure. However, in particular for the above-described case of fault, vibration excitation and torque amplification cannot be entirely prevented.

The invention is based on the object of specifying a generator stator configuration, in particular for large-scale electrical generators of hydroelectric plants, having a vertical rotational axis, which is distinguished by a high structural strength and a low tendency to vibrate and by manufacturing and design simplicity.

The object on which the invention is based is achieved by the features of the independent claim.

The inventors have recognized that a failsafe generator stator configuration arises in that the actual generator stator is implemented as monolithic and having high intrinsic rigidity and a spring-elastic support structure is selected to implement an elastic foundation connection to decouple vibrations.

Accordingly, instead of a combination made of a stator core, which fulfills the magnetic function, and a load-bearing stator frame, a single stiffened stator core is used, which fulfills a double function, namely the magnetic task and the load-bearing task. This stiffened stator core rests on a spring-elastic support structure for vibration decoupling. These are typically supports which are implemented having a lower rigidity than the structural rigidity of the stiffened stator core. Accordingly, occurring vibrations will lead to relative movements of the stiffened stator core in relation to the foundation, i.e., the spring-elastic support structure will execute the actual vibrations toward the foundation and the deformations of the stiffened stator core itself remain limited.

To implement the stiffened stator core according to the invention, in one embodiment, the individual stator plates are materially bonded after the assembly of the plate packets on the side facing away from the air gap, i.e., the radial outer periphery. In the simplest case, this is performed by welding stator plates which adjoin each other in each case on at least one connection point. Multiple axially running weld seams spaced apart around the circumference, which follow the entire longitudinal extension of the stator core, are particularly preferably applied to the radial outer periphery of the stator plates. In this way, the stator plates, which are initially individually stacked one on top of another, are connected after the orientation and compression to form the monolithic unit according to the invention, which is referred to in the present case as the stiffened stator core. Furthermore, other material bonding technologies, such as glued joints, are also conceivable. In addition, the stator plates are preferably axially compressed to increase the structural strength of the stiffened stator core.

As an additional or alternative measure to the material bonding of respective adjacent stator plates, stiffening elements may be provided on the radial outer periphery. These are typically ribbed or plate-shaped elements, which have a material bond, such as a weld bond, to the individual stator plates.

For a particularly preferred embodiment, both axially running weld seams for the direct connection of adjacent stator plates and also connection elements situated distributed over the outer circumference of the stiffened stator core in the form of diagonal plates are used, which each have at least one weld seam running along a side edge in the axial direction for the material bonding of the stator plates.

Furthermore, for the preferred embodiment, the stiffening elements produce connections between a first compression ring and a second compression ring, which are situated on the axial ends of the stiffened stator core. The compression rings act on the respective axial outer stator plates via compression fingers. In addition to the connection of the first compression ring and the second compression ring via a multitude of connection elements which are welded to the stator plates, a traction element can be provided, which is led from the first compression ring to the second compression ring through aligned recesses in the stator plates. The traction element and the associated bolts are preferably provided with electrical insulation bushes.

According to a refinement of the invention, the stiffened stator core comprises such a configuration of stiffening elements on the radial outer periphery having material bonding to the stator plates, so that high torsion torques may be absorbed. A diagonal configuration of the stiffening elements suggests itself for this purpose. This is understood as tilting of plate-shaped stiffening elements in relation to the radial direction. In other words, this means that the plate-shaped stiffening elements have a directional component pointing in the tangential direction.

If at least one of the compression rings is applied so that it protrudes beyond the radial outer periphery of the stator plates for such an embodiment, a stiffening element can have a torque-supporting connection to the compression ring or a retention element connected thereto on at least one side edge. For a preferred embodiment, the upper compression ring and/or the lower compression ring have recesses for this purpose, which are inclined in relation to the radial direction. A plate-shaped applied stiffening element is inserted into such a recess and a connection is produced between the upper and/or lower border of the connection element and at least one of the front sides of the recess, for example, using a screw connection. If the material bond according to the invention of the stiffening element to at least two stator plates is additionally performed along its adjoining side edge, a diagonal support results for absorbing generator torques and for damping torsional vibrations in the generator stator.

The spring-elastic support structure of the stator configuration for implementing an elastic foundation connection of the stiffened stator core is preferably implemented by a configuration of three or more feet having a multitude of leaf springs. Multiple leaf springs are connected to form a leaf spring packet, in that bundling elements are provided for the lateral guiding on both ends of a foot. These bundling elements are preferably cast-iron parts, which are constructed in multiple segments and enclose the leaf spring elements by a screw connection of the individual parts. A spring steel, for example, an SAE 5160 material comes into consideration as a possible material of the leaf springs.

The invention is explained in greater detail hereafter on the basis of preferred exemplary embodiments and illustrations in the figures. Specifically, in the figures.

Figure 1:
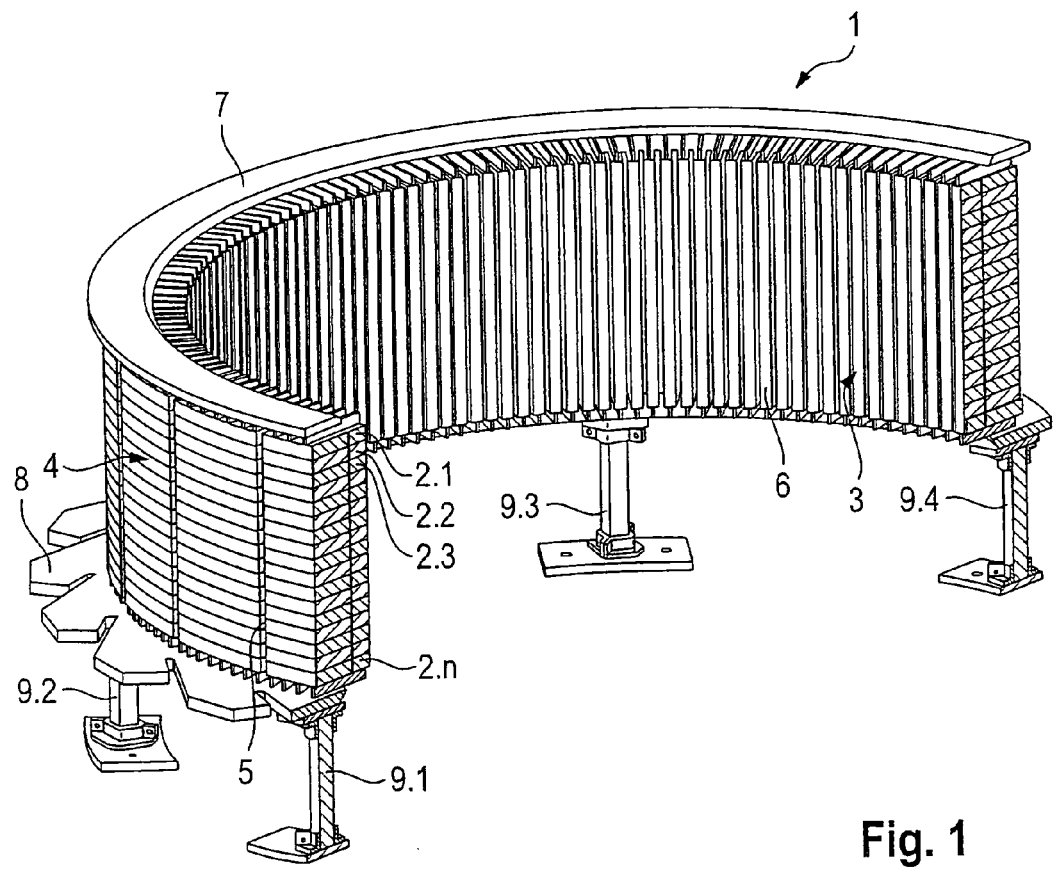
FIG. 1 shows a perspective view in partial section of a generator stator configuration according to the invention.

FIG. 1 shows a generator stator configuration according to the invention in schematically simplified form. The monolithic implementation of a stiffened stator core 1 is shown, which fulfills the requirements with respect to the magnetic properties and the structural strength. The stiffened stator core 1 represents a monolithic component, in which the originally provided individual components are materially bonded to one another to achieve a high structural strength.

For the illustrated preferred embodiment, the exemplary stator plates 2.1, 2.2, 2.3, . . . , 2.n shown, which each comprise stator teeth 6 on the radial inner periphery 3, have a material bond on the radial outer periphery 4 in the form of a weld seam 5. In addition, an apparatus is shown for the axial compression using a first compression ring 7 and a second compression ring 8, which is explained in greater detail hereafter.

The stiffened generator core 1, which is provided with high structural strength, is vertically supported against the foundation by a spring-elastic structure, which has a lower spring elasticity than the stiffened stator core itself in all movement directions except for the vertical. For the preferred embodiment, the feet 9.1, 9.2, 9.3, 9.4 are constructed in the form of leaf spring stacks, the individual leaf springs being oriented essentially vertically in the installed location. This is obvious from FIG. 2.

Figure 2:
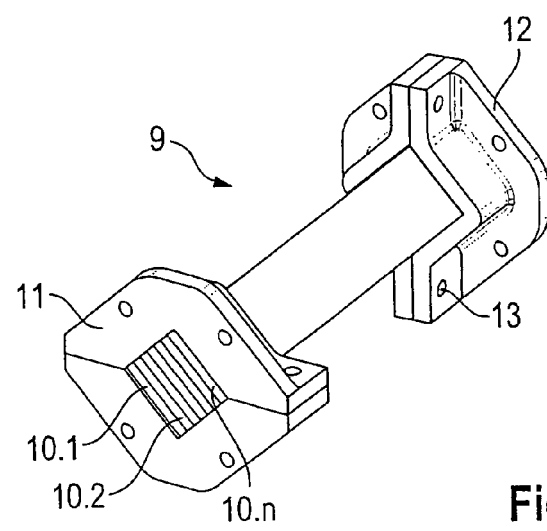
FIG. 2 shows the spring-elastic foot of a generator stator configuration according to the invention.

The foot 9 shown in FIG. 2 comprises a multitude of leaf springs 10.1, 10.2, . . . , 10.n layered on one another in a stack, which are bundled at the ends. For this purpose, the first bundling element 11, which also produces a connection to the foundation, and the second bundling element 12, which forms the connection to the stiffened generator core 1, are provided. The bundling elements 11, 12 are preferably multisegment cast parts, which are joined together using a screw connection 13 to enclose the leaf spring stack. The individual parts of the bundling elements 11, 12 may be assembled from standard parts. This is also true for the individual leaf springs 10.1, . . . , 10.n, which are produced from a suitable spring steel.

Figure 3:
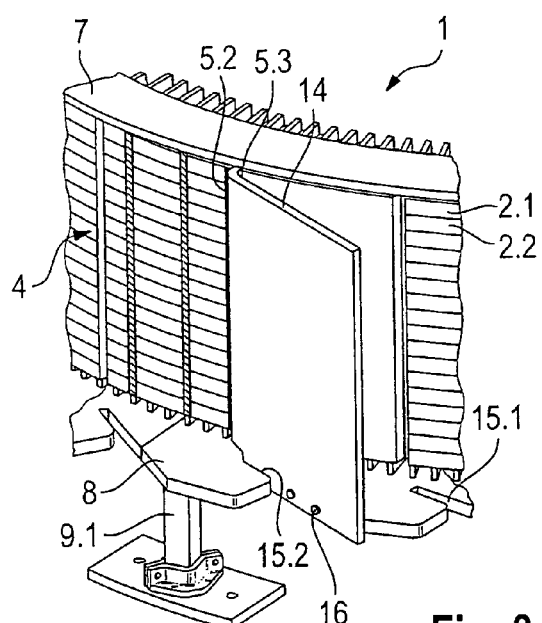
FIG. 3 shows a further embodiment of the generator stator configuration according to the invention having a stiffening element.
Figure 4A:
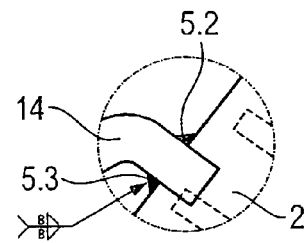
FIGS. 4a and 4b show axial sections of material bonds between a stator plate and a stiffening element or for adjoining stator plates, respectively.
Figure 4B:
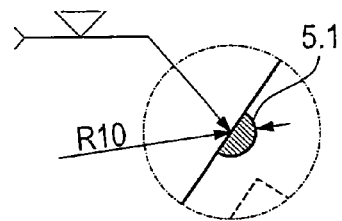

FIG. 3 shows a detail of a preferred embodiment for a stiffened stator core 1 having a material bond on the radial outer periphery 4 for the stator plates 2-2.n using a stiffening element 14. The stiffening element 14 is applied in plate-shaped form and produces a material bond at a first side edge facing toward the stator plates 2.1-2.n using the weld seams 5.2, 5.3 shown in detail in FIG. 4a. In addition, at least one direct material bond of the individual stator plates 2.1-2.n using a weld seam 5.1 running in the axial direction in the form of a concave fillet weld is provided—this is shown in FIG. 4b. Of course, a multitude of connection elements 14 and a multitude of material bonds implemented independently of the connection elements 14 corresponding to the weld seam 5.1 may be provided along the outer circumference to connect the stator plates 2.1-2.n.

A particularly preferred embodiment for a stiffening element 14, which particularly dissipates torsion torques, is shown in FIG. 3. For this purpose, the plate-shaped applied stiffening element 14 is oriented at an angle in relation to the radial direction and is supported diagonally against a collar 22 protruding radially outward on the second compression ring 8. A corresponding collar can be provided on the first compression ring 7—this embodiment variant is not shown in detail in FIG. 3.

To simplify the installation of the stiffening element 14, recesses 15.1, 15.2 are provided in the collar 22 of the second compression ring 8. The stiffening element 14 shown in FIG. 3 is inserted into one of the recesses 15.2 and is fastened using a screw connection 6 on its lower border area to the wall of the recess 15.2.

For this purpose, the recess 15.2 is cut in the radial outer area, so that accessibility for installation exists. Accordingly, the stiffening element 14 is enclosed on both sides by the walls of the recess only in the radial inner curve of the recess 15.1, 15.2. In addition to the screw connection 16, further material bonds, such as a weld bond, may be provided for joining the stiffening element 14 and the compression ring, in this case the second compression ring 8. The screw connection 16 is advantageously executed first during the installation, the welding including the weld seams 5.2 and 5.3 is then performed to produce the material bond to the stator plates 2.1-2.*n*.

Figure 5:
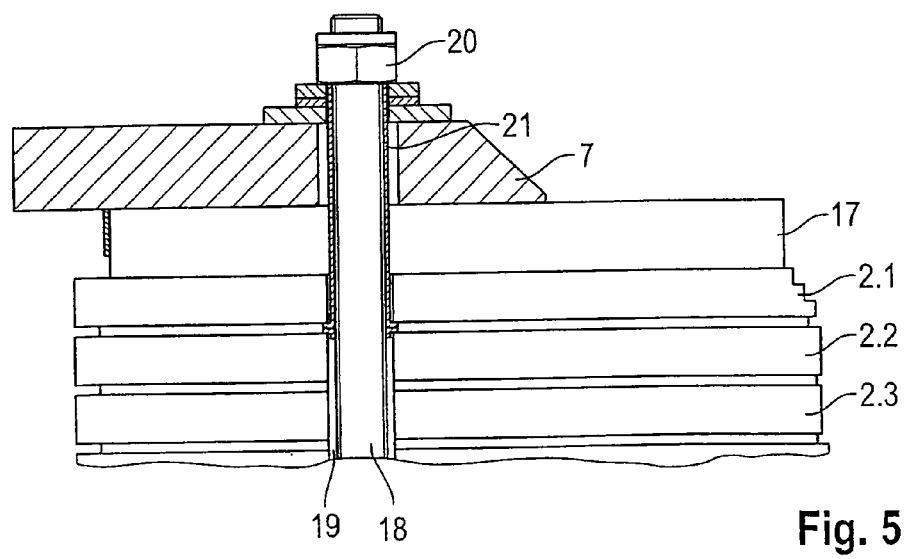
FIG. 5 shows an apparatus for the axial compression of the stator plates for a preferred embodiment of a generator stator configuration according to the invention.

FIG. 5 shows an embodiment detail in axial section for the generator stator configuration according to the invention. A traction element 18 is shown, which is guided through an aligned recess 19 in the generator plates 2.1-2.*n* and produces a connection between the first compression ring 7 and the second compression ring 8 (not shown in the present case). In this way, axial traction forces are generated on the plate packet, which act via a multitude of compression fingers 17 on the respective outer stator plates. Furthermore, an insulation element 21 is provided for the electrical insulation of the traction element 18. The above-described axial traction apparatus for the compression of the plate packet having the stator plates is preferably used in addition to the material bonding of the stator plates on the outer periphery of the stiffened stator core in order to provide it with the highest possible structural strength.

Further embodiments of the invention are conceivable in the scope of the following claims. Thus, the spring-elastic support structure for implementing an elastic foundation connection for the stiffened generator core can comprise radially active spring-elastic components, which act separately from the elastic spring components in the axial direction. Furthermore, it is conceivable to further stiffen the stiffened stator core by a material bond formed flatly in the axial direction, for example, using a glued joint between the stator plates.

LIST OF REFERENCE NUMERALS 1 stiffened stator core
2, 2.1, 2.2, 2.3, 2.*n* stator plate
3 radial inner periphery
4 radial outer periphery
5, 5.1, 5.2, 5.3 weld seam
6 stator tooth
7 first compression ring
8 second compression ring
9, 9.1, 9.2, 9.3, 9.4 foot
10.1, 10.2, 10.*n* leaf spring
11 first bundling element
12 second bundling element
13 screw connection
14 stiffening element
15.1, 15.2 recess
16 screw connection
17 compression spring
18 traction element
19 aligned recess
20 screw nut
21 insulation element
22 collar

The invention claimed is:

1. A generator stator configuration comprising:
a stiffened stator core having a multitude of stator plates, which have stator teeth on the radial inner periphery of the stator core, each stator plate having a material bond on the radial outer periphery on at least one connection point to at least one of an adjacent stator plate and a stiffening element;
a spring-elastic support structure for implementing an elastic foundation connection for the stiffened stator core, wherein the spring-elastic support structure for implementing an elastic foundation connection comprises at least one foot having a multitude of leaf springs; the stiffening element produces, in addition to the material bond to the stator plate, a connection between a first compression ring and a second compression ring, wherein the first compression ring and the second compression ring are situated at the axial ends of the stator core.

2. The generator stator configuration according to claim 1, wherein the material bond is implemented as a weld bond.

3. The generator stator configuration according to claim 2, wherein the material bond comprises a weld seam, wherein the weld seam connects at least two adjacent stator plates and runs axially.

4. The generator stator configuration according to claim 3, wherein the stiffening element is implemented as plate-shaped and has a material bond to at least two stator plates on a first side edge using an axially running weld seam, and is connected to at least one of the compression rings on a second side edge.

5. The generator stator configuration according to claim 2, wherein the stiffening element is implemented as plate-shaped and has a material bond to at least two stator plates on a first side edge using an axially running weld seam, and is connected to at least one of the compression rings on a second side edge.

6. The generator stator configuration according to claim 5, wherein the connection of the stiffening element to at least one of the compression rings comprises a screw connection.

7. The generator stator configuration according to claim 1, wherein the material bond comprises a weld steam, wherein the weld steam connects to at least two adjacent stator plates and runs axially.

8. The generator stator configuration according to claim 7, wherein the stiffening element is implemented as plate-shaped and has a material bond to at least two stator plates on a first side edge using an axially running weld seam, and is connected to at least one of the compression rings on a second side edge.

9. The generator stator configuration according to claim 8, wherein the connection of the stiffening element to at least one of the compression rings comprises a screw connection.

10. The generator stator configuration according to claim 1, wherein the stiffening element is implemented as plate-shaped and has a material bond to at least two stator plates on a first side edge using an axially running weld seam, and is connected to at least one of the compression rings on a second side edge.

11. The generator stator configuration according to claim 10, wherein the connection of the stiffening element to at least one of the compression rings comprises a screw connection.

12. The generator stator configuration according to claim 1, wherein a multitude of stiffening elements are distributed around the circumference and are provided on the radial outer periphery of the stiffened stator core.

13. The generator stator configuration according to claim 1, wherein axial compression forces are exerted on the stator plates using a multitude of compression fingers, wherein the multitude of compression fingers are situated on the two axial ends of the stiffened stator core.

14. The generator stator configuration according to claim 1, wherein the leaf springs have a bundling element for lateral guiding at least on both ends of the foot.

15. The generator stator configuration according to claim 14, wherein the bundling element is implemented as a cast-iron part.

16. The generator stator configuration according to claim 1, wherein the leaf springs are oriented essentially vertically in the installed position.

17. An electrical machine, for a hydroelectric plant, comprising a generator stator configuration according to claim 1.

18. A generator stator configuration comprising:
a stiffened stator core having a multitude of stator plates, which have stator teeth on the radial inner periphery of the stator core, each stator plate having a material bond on the radial outer periphery on at least one connection point to at least one of an adjacent stator plate and a stiffening element, wherein the material bond comprises a weld seam that connects at least two adjacent stator plates and runs axially;
a spring-elastic support structure for implementing an elastic foundation connection for the stiffened stator core;
the stiffening element produces, in addition to the material bond to the stator plate, a connection between a first compression ring and a second compression ring, wherein the first compression ring and the second compression ring are situated at the axial ends of the stator core, wherein at least one of the compression rings has recesses, wherein the recesses run in a diagonal position to the radial direction, and wherein the recesses are used to receive the stiffening elements.

19. A generator stator configuration comprising:
a stiffened stator core having a multitude of stator plates, which have stator teeth on the radial inner periphery of the stator core, each stator plate having a material bond on the radial outer periphery on at least one connection point to an adjacent stator plate and/or to a stiffening element, wherein the material bond is implemented as a weld bond, and wherein the material bond comprises a weld seam that connects at least two adjacent stator plates and runs axially;
a spring-elastic support structure for implementing an elastic foundation connection for the stiffened stator core;
the stiffening element produces, in addition to the material bond to the stator plate, a connection between a first compression ring and a second compression ring, which are situated at the axial ends of the stator core, wherein at least one of the compression rings has recesses, wherein the recesses run in a diagonal position to the radial direction, and wherein the recesses are used to receive the stiffening elements.

* * * * *